(12) United States Patent
Bank et al.

(10) Patent No.: US 9,104,771 B2
(45) Date of Patent: Aug. 11, 2015

(54) PROVIDING RELEVANT PRODUCT REVIEWS TO THE USER TO AID IN PURCHASING DECISION

(75) Inventors: Judith H. Bank, Morrisville, NC (US); Lisa M. Bradley, Cary, NC (US); Lin Sun, Morrisville, NC (US); ChunHui Yang, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 576 days.

(21) Appl. No.: 13/288,356

(22) Filed: Nov. 3, 2011

(65) Prior Publication Data
US 2013/0117329 A1    May 9, 2013

(51) Int. Cl.
*G06F 7/00*      (2006.01)
*G06F 17/30*     (2006.01)

(52) U.S. Cl.
CPC ................. *G06F 17/30873* (2013.01)

(58) Field of Classification Search
CPC combination set(s) only.
See application file for complete search history.

(56) References Cited

U.S. PATENT DOCUMENTS

| 8,359,285 | B1 * | 1/2013 | Dicker et al. ................... 706/45 |
| 2004/0235460 | A1 | 11/2004 | Engstrom et al. |
| 2009/0282019 | A1 | 11/2009 | Galitsky et al. |
| 2010/0299361 | A1 | 11/2010 | Geney et al. |
| 2011/0288911 | A1 * | 11/2011 | Barnes, Jr. ................... 705/14.1 |
| 2011/0307340 | A1 * | 12/2011 | Benmbarek ................ 705/14.73 |
| 2012/0278127 | A1 * | 11/2012 | Kirakosyan et al. ......... 705/7.29 |
| 2013/0006881 | A1 * | 1/2013 | Klemm ........................ 705/319 |

\* cited by examiner

*Primary Examiner* — Azam Cheema
(74) *Attorney, Agent, or Firm* — Robert A. Voigt, Jr.; Winstead, P.C.

(57) ABSTRACT

A method, system and computer program product for providing relevant product reviews to a user. A user's session on a website is monitored to gather information related to reviewing and writing product reviews as well as to buying and browsing habits. The actions performed by the user in connection with the monitored user session are populated in a database. Once populating the database is completed, the personality report of the user, which includes personality traits, is generated using the populated database. Also, a list of reviewers that are favored by the user is generated. By using the personality traits of the user to match reviews of interest as well as providing reviews from those reviewers favored by the user, the user can have more confidence in the usefulness or relevance of these reviews.

16 Claims, 5 Drawing Sheets

PROVIDING RELEVANT PRODUCT REVIEWS TO THE USER TO AID IN PURCHASING DECISION

TECHNICAL FIELD

The present invention relates to product reviews, and more particularly to providing relevant product reviews from preferred sources that are selected based on the personality and behavior of the user.

BACKGROUND

One of the advantages that the Internet provides to consumers is the ability to research specific products or services and find out information about those products or services before making a purchase. A popular venue for researching products or services is user reviews. A review is an evaluation of a product or service, such as a video game, a book, a home appliance, a computer, etc. These reviews (including reviews for services) may collectively be referred to herein as "product reviews." In such product reviews, the reviewer typically includes a short summary of a user's reason for purchasing (or not purchasing) the product or service. In addition to the critical evaluation, the reviewer may assign a rating (e.g., 1 star to 5 stars) to indicate how happy the reviewer is with the product being reviewed.

While product reviews may assist a user in deciding whether to purchase a product or service, it would be beneficial if the user could have confidence that such reviews could be trusted. That is, a user would have a more meaningful shopping experience if the user had confidence that the review's author had "good judgment."

Attempts have been made by websites, such as www.amazon.com, that collect reviews and ratings for products and services, to allow users to indicate whether they like specific product reviews. For example, a website (e.g., www.amazon.com) may indicate the number of people (e.g., 117 of 119) who found a particular product review helpful. However, this is a general rating and is not personalized to reflect the preferences of a specific user. As a result, it is difficult for a user to determine whether a highly rated review is really useful to him/her personally.

Hence, there is currently not a means for providing relevant product reviews to the user to aid in his/her purchasing decision.

BRIEF SUMMARY

In one embodiment of the present invention, a method for providing relevant product reviews to a user comprises monitoring a user session on a first website to gather information related to one or more of the following: purchasing habits, browsing habits and reviewing and writing product reviews. The method further comprises populating a database with actions performed by the user in connection with the monitored user session. Additionally, the method comprises generating one or more of the following: a personality report of the user comprising personality traits of the user using the populated database, and a list of reviewers designated as favored using the populated database. Furthermore, the method comprises searching and identifying product reviews of interest on a product or a service using one or more of the following: the personality report of the user, and the list of reviewers designated as favored. In addition, the method comprises displaying, by a processor, one or more of the identified product reviews of interest on the product or the service that meet a threshold criteria to the user.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for providing relevant product reviews to a user. In one embodiment of the present invention, a user's session on a website is monitored to gather information related to the user reviewing or writing product reviews as well as to the user's purchasing and browsing habits. The actions performed by the user in connection with the monitored user session are populated in a database, referred to herein as the "review history database." The review history database may also be populated with information from reviews written by the user's friends from the user's social network or from the user's contact list. Furthermore, the review history database may be populated with information from reviews written by the user. Once populating the review history database is completed, the personality report of the user is generated using the populated review history database. The personality report of the user includes personality traits of the user (e.g., craves adventure, cautious) which are derived from the information stored in the review history database (e.g., user is more interested in negative reviews and therefore may be a more cautious person who wants to see all of the unflattering remarks about a product or service to aid in deciding whether to purchase the product or service). Furthermore, once populating the review history database is completed, a list of reviewers designated as "favored" is generated using the populated review history database. Such a list contains the identity of reviewers who the user favors (e.g., the user may have made positive comments about the product reviews written by such a reviewer). Product reviews on a product or service that are of interest to the user may be identified based on the personality traits of the user (e.g., cautious person) by matching keywords or phrases (e.g., warning) in the reviews with the personality traits of the user.

Furthermore, product reviews of interest on a product or service may be obtained from those favored reviewers if they have written reviews on such products or services. By using the personality traits of the user to match reviews of interest as well as providing the reviews from those reviewers favored by the user, the user can have more confidence in the usefulness or relevance of these reviews.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
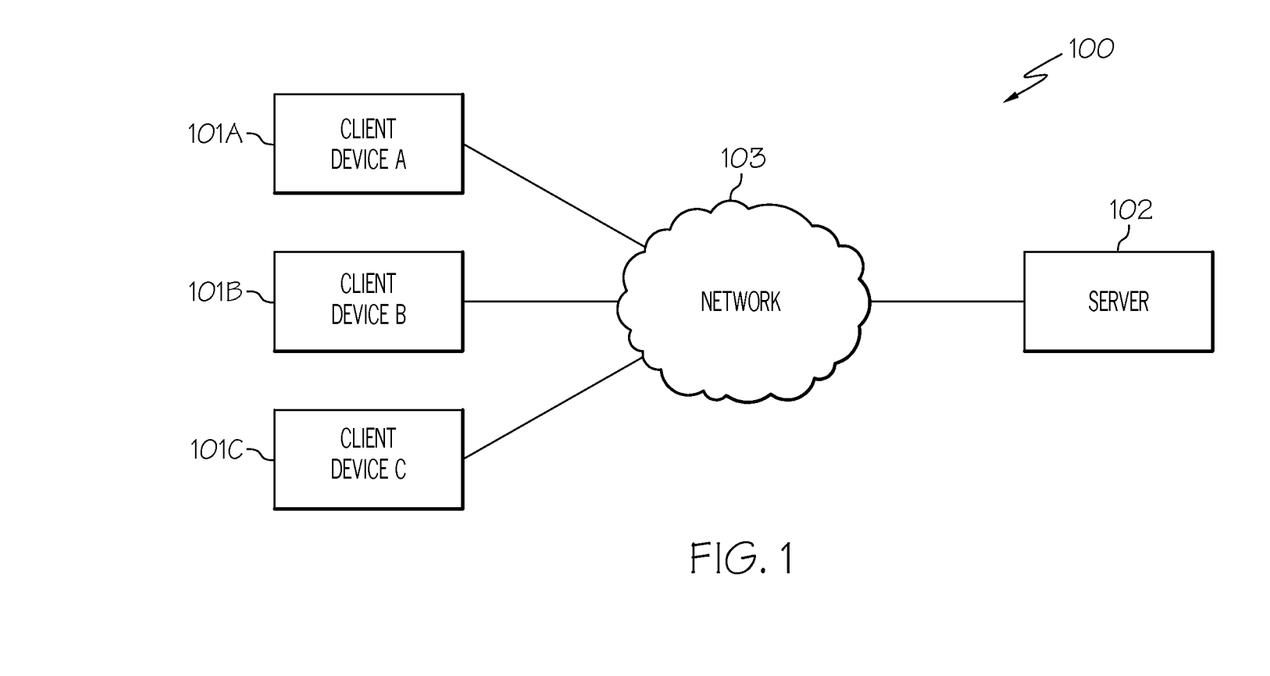
FIG. 1 illustrates a network system configured in accordance with an embodiment of the present invention.

Referring now to the Figures in detail, FIG. 1 illustrates a network system 100 configured in accordance with an embodiment of the present invention. Referring to FIG. 1, network system 100 includes a community of users using client devices 101A-101C (identified as "Client Device A," "Client Device B," and "Client Device C," respectively, in FIG. 1) connected to a server 102 via a network 103. Client 101 and server 102 are interconnected with network 103 via any medium type (e.g., wireless, wired). Client 101 may be any type of computing device (e.g., portable computing unit, personal digital assistant (PDA), smartphone, laptop computer, mobile phone, navigation device, game console, desktop computer system, workstation, Internet appliance and the like) configured with the capability of connecting to network 103 and consequently communicating with other clients 101 and server 102. A description of the hardware configuration of client 101 is provided below in connection with FIG. 2.

In one embodiment, server 102 may be a web server configured to host websites. In another embodiment, server 102 may be a social network server configured with the capability of offering social networking and/or microblogging services, enabling users of client devices 101 to send and read other users' posts (e.g., product reviews).

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

While FIG. 1 illustrates three clients 101A-101C and a single server 102, network system 100 may include any number of clients 101 and servers 102. The embodiments of network system 100 are not to be limited in scope to the depiction of FIG. 1.

Figure 2:
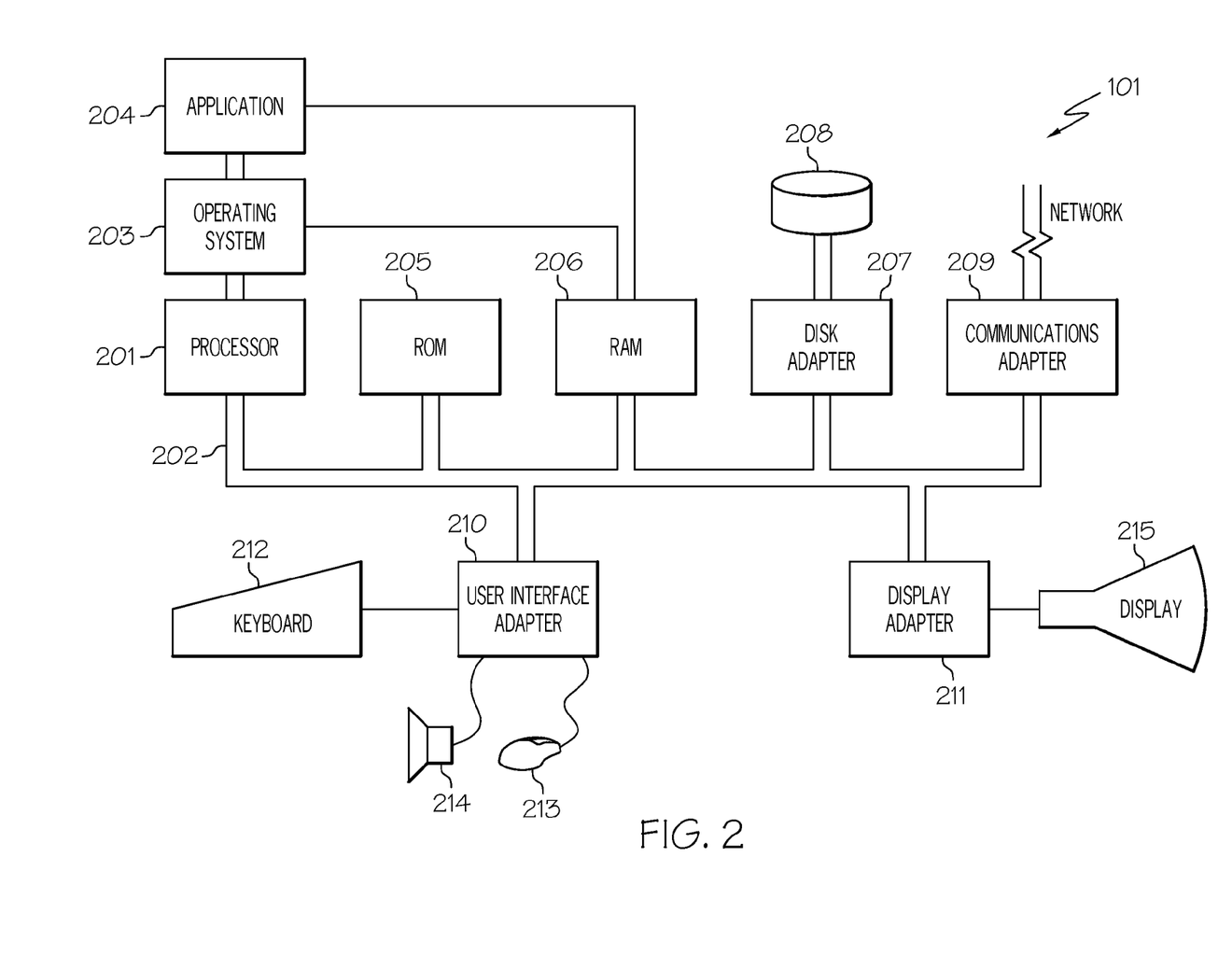
FIG. 2 illustrates a hardware configuration of a client device configured in accordance with an embodiment of the present invention.

Referring now to FIG. 2, FIG. 2 illustrates a hardware configuration of client 101 (FIG. 1) which is representative of a hardware environment for practicing the present invention. Referring to FIG. 2, client 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a browser, a program for providing relevant product reviews for the user of client 101 as discussed further below in association with FIGS. 3A-3B and 4. In one embodiment, the program for providing relevant product reviews for the user of client 101 is embodied as a plug-in to a web browser.

Referring again to FIG. 2, read-only memory ("ROM") 205 is coupled to system bus 202 and includes a basic input/output system ("BIOS") that controls certain basic functions of client 101. Random access memory ("RAM") 206 and disk adapter 207 are also coupled to system bus 202. It should be noted that software components including operating system 203 and application 204 may be loaded into RAM 206, which may be client's 101 main memory for execution. Disk adapter 207 may be an integrated drive electronics ("IDE") adapter that communicates with a disk unit 208, e.g., disk drive. In one embodiment, disk unit 208 stores a database, referred to herein as the review history database, that stores information related to the actions of the user in connection with reviewing and writing product reviews as well as stores information related to reviews written by friends of the user in the user's social network/contact list as discussed further herein in connection with FIGS. 3A-3B. In one embodiment, the database is managed using a least recently used algorithm. In one embodiment, disk unit 208 stores the personality report that contains the personality traits of the user as discussed further below in connection with FIGS. 3A-3B and 4. In one embodiment, disk unit 208 stores the list of favored reviewers as discussed further below in connection with FIGS. 3A-3B and 4. It is noted that the program for providing relevant product reviews for the user of client 101, as discussed further below in connection with FIGS. 3A-3B and 4, may reside in disk unit 208 or in application 204.

Client 101 may further include a communications adapter 209 coupled to bus 202. Communications adapter 209 interconnects bus 202 with an outside network (network 103) thereby enabling client 101 to communicate with other clients 101 and server 102.

I/O devices may also be connected to client 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to client 101 through keyboard 212 or mouse 213 and receiving output from client 101 via display 215 or speaker 214.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, while product reviews may assist a user in deciding whether to purchase a product or service, it would be beneficial if the user could have confidence that such reviews could be trusted. That is, a user would have a more meaningful shopping experience if the user had confidence that the review's author had "good judgment." Attempts have been made by websites, such as www.amazon.com, that collect reviews and ratings for products and services, to allow users to indicate whether they like specific product reviews. For example, a website (e.g., www.amazon.com) may indicate the number of people (e.g., 117 of 119) who found a particular product review helpful. However, this is a general rating and is not personalized to reflect the preferences of a specific user. As a result, it is difficult for a user to determine whether a highly rated review is really useful to him/her personally. Hence, there is currently not a means for providing relevant product reviews to the user to aid in his/her purchasing decision.

Figure 3A:
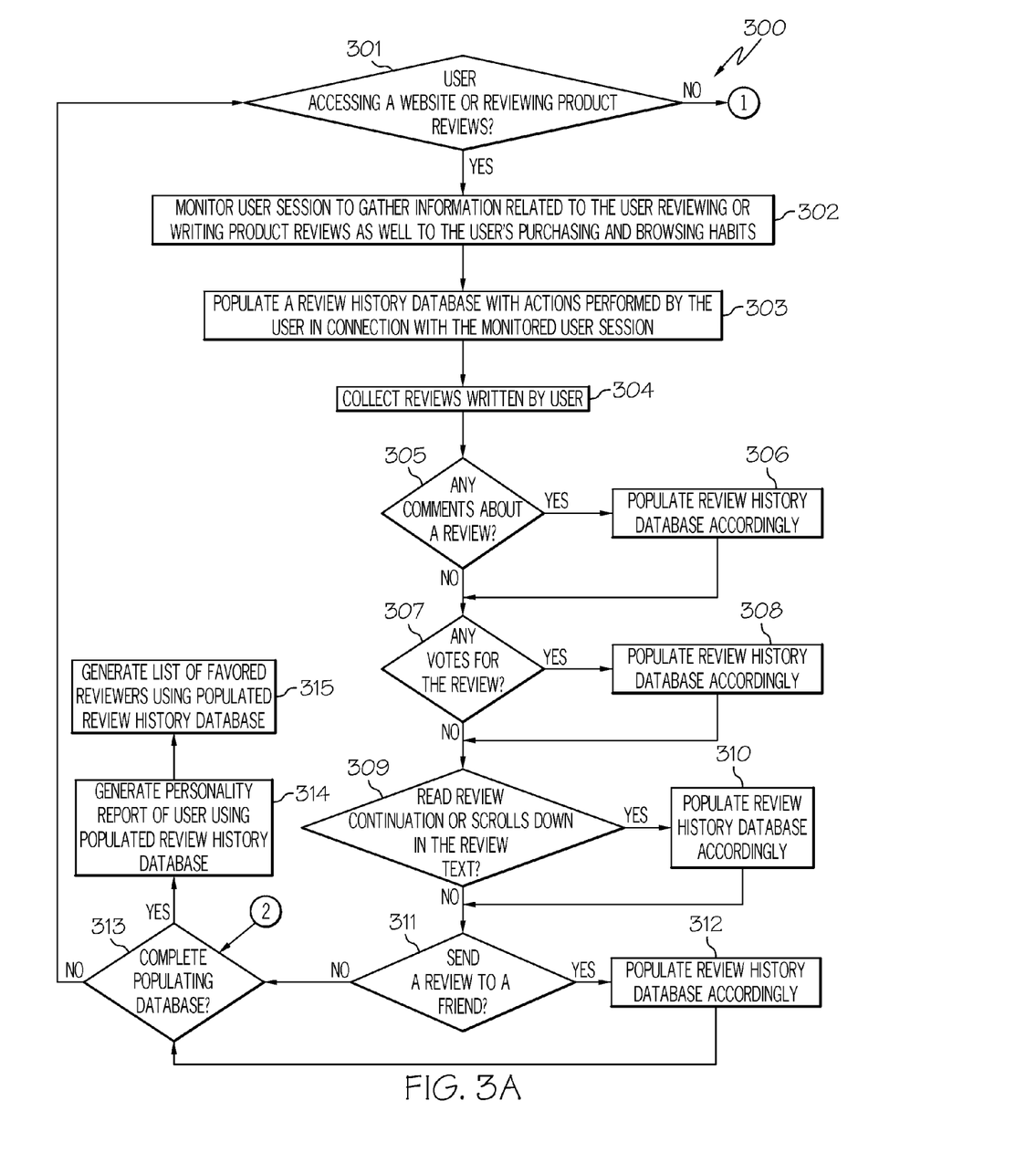
FIGS. 3A-3B are a flowchart of a method for populating a review history database with information related to a review process which is used to generate a personality report of the user as well as a list of favored reviewers in accordance with an embodiment of the present invention.
Figure 3B:
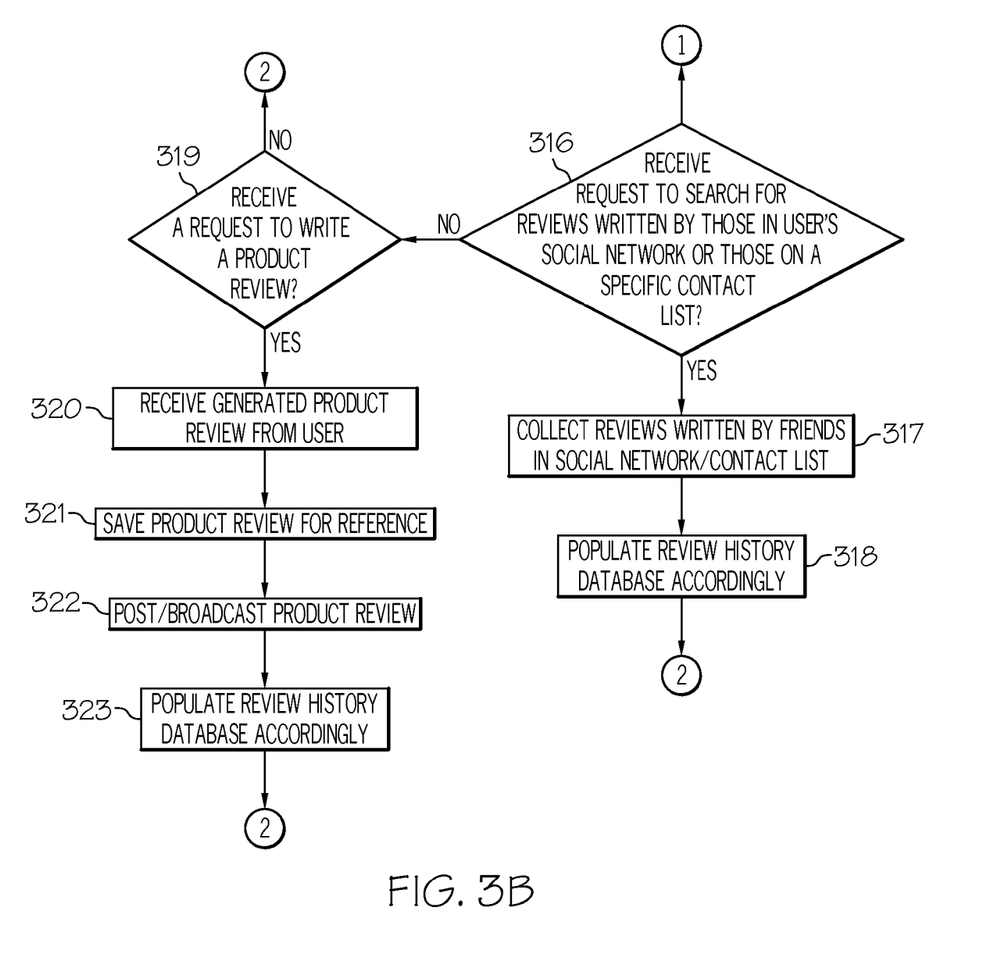
Figure 4:
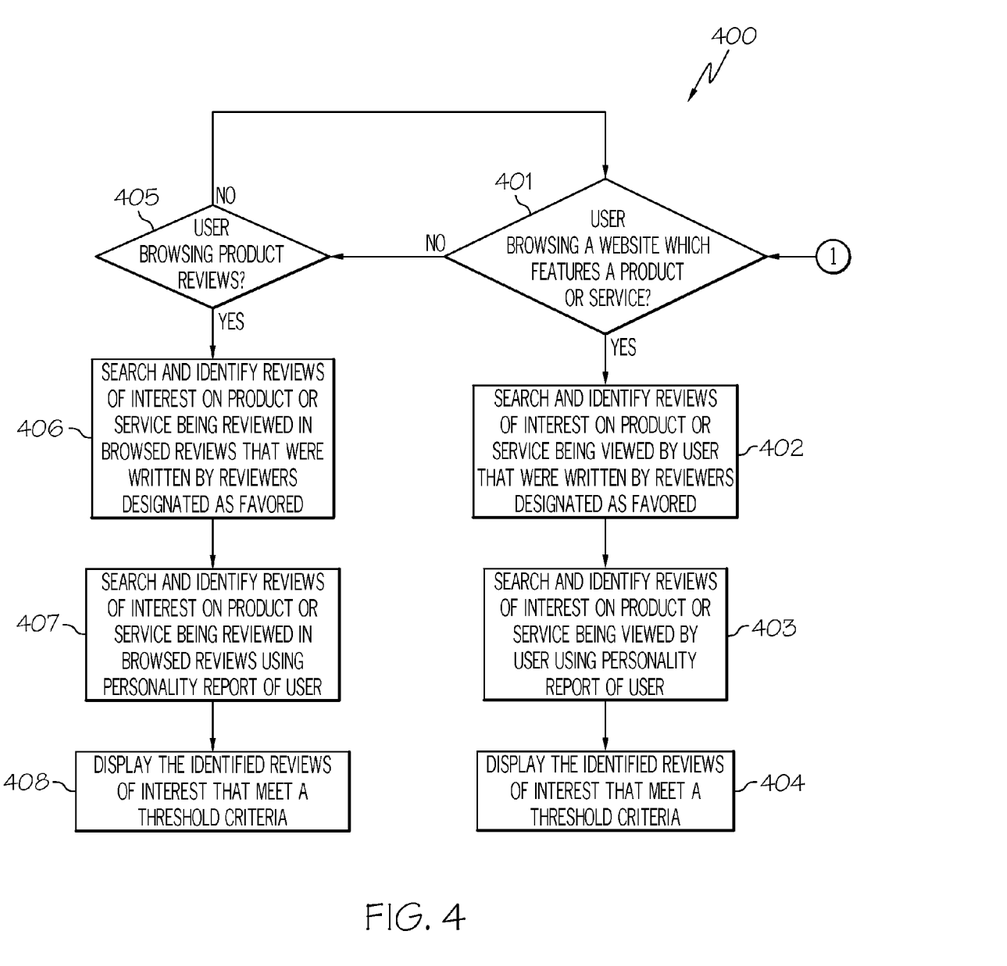
FIG. 4 is a flowchart of a method for providing relevant product reviews to the user in accordance with an embodiment of the present invention.

The principles of the present invention provide a means for providing relevant product reviews to the user to aid in his/her purchasing decision as discussed below in connection with FIGS. 3A-3B and 4. FIGS. 3A-3B are a flowchart of a method for populating a review history database with information related to a review process which is used to generate a personality report of the user as well as a list of favored reviewers. FIG. 4 is a flowchart of a method for providing relevant product reviews to a user.

As stated above, FIGS. 3A-3B are a flowchart of a method 300 for populating a review history database with information related to a review process in accordance with an embodiment of the present invention.

Referring to FIG. 3A, in conjunction with FIGS. 1-2, in step 301, client 101 (shown in FIG. 1) determines if the user is accessing a website or reviewing product reviews, such as on a website. In order to determine the personality traits of the user concerning product reviews, the personality traits of the user may be obtained by monitoring the user when the user is accessing a website to purchase a product or service or when the user is reviewing or writing product reviews. Furthermore, as discussed in greater detail below, such monitoring may be used to identify reviewers who the user favors. In one embodiment, the determination step concerns whether the user is accessing any arbitrary website or reviewing any arbitrary product review.

If the user is accessing a website or reviewing product reviews, then, in step 302, client 101 monitors the user session to gather information related to the user reviewing or writing product reviews as well as to the user's purchasing and browsing habits. Monitoring includes, without limitation, monitoring the user's actions in connection with reviewing product reviews. For example, the user's actions may include posting a comment about a review or voting that the review was helpful. Monitoring may further include monitoring product reviews written by the user. Monitoring may also include monitoring the user's purchasing habits or the user's browsing habits. For example, the user may purchase or browse mainly luxury items. By monitoring the user's actions, a personality report of the user will be able to be generated which includes the personality traits of the user based on these actions. For instance, if the user is more interested in negative reviews, then the user may be a cautious person and would want to see all of the unflattering remarks about a product or service to aid in deciding whether to purchase the product or service. In another example, the user may only be interested in positive information since the user does not mind adversity and takes unpleasant surprises in stride. In a further example, if the user has shown interest in browsing or purchasing luxury items, then the user may be deemed to be more extravagant than frugal.

In step 303, client 101 populates a database, referred to herein as the "review history database," with actions performed by the user in connection with the monitored user session. For example, the user's purchasing habits may be populated in the review history database. While the following discusses the user's actions being stored in a database, it is noted that the actions may be stored in any type of organized collection of data, such as a file, etc. Furthermore, while the following discusses populating the review history database with actions performed by the user in connection with reviewing/writing the product reviews, the review history database is also populated with the purchasing and browsing habits of the user as discussed above. Furthermore, the following are illustrative examples of actions that may be performed in connection with reviewing/writing the product reviews. The principles of the present invention are not to be limited in scope to these illustrative examples and include other actions that may be performed in connection with reviewing/writing the product reviews.

In step 304, client 101 collects reviews written by the user. Such information may be very valuable in determining the personality traits of the user as well as which type of product reviews from which type of reviewers the user would be interested in viewing. Such information may be populated in the review history table, which may be dynamically updated over time. For example, in the past, the user may have reviewed a pair of jeans sold by Kmart® that cost $20 and indicated how much he/she liked them. As a result, the user may be associated with the personality trait of being frugal. Recently though, the user indicated that the user preferred a pair of jeans sold by Banana Republic® that cost $135. Since Banana Republic® is a more upscale store than Kmart®, this may cause the personality trait of the user to be updated such that the user may be deemed to be more extravagant than frugal. In another example, the user's writing style in these reviews may be used to match product reviews that match the user's writing style. For instance, if the user uses very precise, proper language, then the user would not be interested in product reviews that contain slang language. In one embodiment, client 101 may additionally collect reviews written by those in the user's social network.

In step 305, a determination is made by client 101 as to whether the user has made any comments about a product review. If the user has made a comment about a product review, then, in step 306, such information is populated in the review history database accordingly. For example, the user may have made positive comments (e.g., "great review, very detailed") about a product review. Such comments may be used to identify particular product reviews that match such features (e.g., very detailed) identified in the user's comments as well as used to identify reviewers (e.g., reviewer that wrote the product review that was identified as being a great review because it was very detailed) that the user trusts. In one embodiment, the identity of a favored reviewer (i.e., a reviewer that wrote a product review that received positive comments by the user) may also be stored in the review history database. In one embodiment, information used to identify the favored reviewer is stored in the review history database, such as the reviewer's name, nickname, e-mail address, etc. It is noted that any information may be stored in the review history database that identifies the favored reviewer as long as it can be used to identify product reviews written by the favored reviewer as discussed further below in connection with FIG. 4.

Upon populating the review history database with comments about a product review, or, if, however, the user has not made any comments about a product review, then, in step 307, a determination is made by client 101 as to whether the user has made any votes for a product review. For example, the user may have indicated that the product review was helpful. If the user has issued a vote for a product a review, then, in step 308, such information is populated in the review history database accordingly. For example, if the user indicated that such a review earned 5 stars out of 5 stars, then the reviewer that wrote such a product review may be stored in the review history database along with the favored review.

Upon populating the review history database with votes for a product review, or, if, however, the user has not made any votes for a product review, then, in step 309, a determination is made by client 101 as to whether the user has read the continuation of a product review or scrolled down in the review text thereby indicating interest in the product review. If the user has read the continuation of a product review or scrolled down in the review text, then, in step 310, such information is populated in the review history database accordingly.

Upon populating the review history database with information in connection with the user reading the continuation of a product review or scrolling down in the review text, or, if, however, the user has not read the continuation of a product review or scrolled down in the review text, then, in step 311, a determination is made by client 101 as to whether the user has sent a review to a friend. If the user has sent a review to a friend, then, in step 312, such information is populated in the review history database accordingly. In one embodiment, sending a review to a friend includes posting the review in the friend's social networking website. The action of sending a review to a friend may indicate positive or negative interest to such a review, where such interest (e.g., positive or negative) may be inferred based on any keywords (e.g., "stupid," "great") used in connection with the review.

Upon populating the review history database with information pertaining to the user sending a review to a friend, or, if, however, the user has not sent a review to a friend, then, in step 313, a determination is made by client 101 as to whether populating of the database is complete. It is noted for clarity that the review history database can be updated once "completed" to ensure that the stored information is up-to-date and accurate and that an updated personality report of the user as well as an updated list of favored reviewers may be generated. "Completed," as used herein, refers to the database being populated with enough information as to generate a personality report of the user and/or a list of favored reviewers that are pertinent.

If populating of the database is complete, then, in step 314, the personality report of the user is generated using the populated review history database. As discussed above, the personality report includes the personality traits of the user based on the user's actions, including browsing/purchasing habits. For example, personality traits, such as craving adventure, cautious, risk taker, frugal, lavish, outgoing, introverted, etc., are derived from the information stored in the populated review history database. By generating a personality report of the user, appropriate product reviews can be provided to the user as discussed further below in connection with FIG. 4. For example, a cautious person may be more interested in reviewing negative reviews as the user may be interested in knowing about all of the unflattering remarks. Furthermore, a reviewer may be deemed to be more trustworthy if the reviews match the personality traits of the user. Such reviews may be identified based on the words and phrases in the reviews that indicate a match to the personality traits of the user.

In step 315, a list of reviewers designated as "favored" is generated using the populated review history database. As discussed above, the review history database may contain the identity of reviewers who the user favors. For example, the user may have made positive comments about the product reviews written by such a reviewer. Product reviews may then be provided to the user from these "favored" reviewers thereby allowing the user to have more confidence in the usefulness or relevance of these reviews.

Referring to step 313, if the populating of the database is not complete, then a determination is made by client 101 if the user is accessing a website or reviewing product reviews in step 301.

Referring to FIG. 3B, in conjunction with FIGS. 1 and 2, if the user is not accessing a website or reviewing product reviews, then, in step 316, a determination is made by client 101 as to whether client 101 received a request to search for reviews written by those in the user's social network or those on a specific contact list. In one embodiment, client 101 generates a button (e.g., "search reviews" button) on display 215 that allows the user to request to search for product reviews written by those in the user's social network. In one embodiment, the user provides client 101 a specific contact list containing a list of reviewers.

If client 101 received a request to search for reviews written by those in the user's social network or those on a specific contact list, then, in step 317, client 101 collects the reviews written by the user's friends identified from the user's social network or from the user's contact list. Such information may be extremely valuable in determining the characteristics of the reviews and reviewers that are of interest to the user. For instance, if the user's friends in the user's social network are all detailed oriented individuals, then the user would prefer to see reviews that are detailed oriented.

In step 318, such information is populated in the review history database accordingly. A determination is then made by client 101 as to whether populating of the database is complete in step 313.

If, however, client 101 did not receive a request to search for reviews written by those in the user's social network or those on a specific contact list, then, in step 319, a determination is made by client 101 as to whether client 101 received a request from the user to write a product review. In one embodiment, client 101 provides an option for the user to write a review on a product or service, such as for a product or service that the user is currently viewing or for a product or service being reviewed in the browsed reviews. In one embodiment, such an option is provided for those products or services for which there is not currently a means to provide a review. In one embodiment, client 101 generates a button (e.g., "review now" button) on display 215 that allows the user to write a product review for the product or service currently being viewed by the user or for the product or service being reviewed in the browsed reviews.

If client 101 received a request from the user to write a product review for the product or service being viewed by the user or for the product or service being reviewed in the browsed reviews, then, in step 320, client 101 receives the generated product review from the user.

In step 321, client 101 saves the generated product review, such as in disk unit 208, for reference.

In step 322, client 101 posts/broadcasts the generated product review. For example, client 101 may post the generated product review on a website of the user's choice. In another example, client 101 may broadcast the generated product review to multiple websites, the user's social network, etc.

In step 323, client 101 populates the review history database with the generated product review. While the preceding only discusses populating the review history database, it is noted that the review history database can be updated once "completed" with any of the actions discussed herein to ensure that the review history database is up-to-date and accurate and that an updated personality report of the user as well as an updated list of favored reviewers may be generated. A determination is then made by client 101 as to whether populating of the database is complete in step 313.

If, however, client 101 did not receive a request from the user to write a product review, then a determination is made by client 101 as to whether populating of the database is complete in step 313.

In some implementations, method 300 may include other and/or additional steps that, for clarity, are not depicted. Further, in some implementations, method 300 may be executed in a different order presented and that the order presented in the discussion of FIGS. 3A-3B is illustrative. Additionally, in some implementations, certain steps in method 300 may be executed in a substantially simultaneous manner or may be omitted.

As discussed above, once the population of the review history database has completed, a personality report of the user and/or a list of favored reviewers are generated which may be used to provide relevant product reviews to a user as discussed below in connection with FIG. 4.

FIG. 4 is a flowchart of a method 400 for providing relevant product reviews to a user in accordance with an embodiment of the present invention.

Referring to FIG. 4, in conjunction with FIGS. 1 and 2, in step 401, client 101 determines if the user is browsing a website which features a product or service.

If the user is browsing a website which features a product or service, then, in step 402, client 101 searches and identifies product reviews of interest on the product or service being viewed by the user that were written by reviewers designated as favored. As discussed above, reviewers may be designated as favored based on the user's actions in connection to such reviewers (e.g., the user rated the review of the reviewer 5 stars out of 5 stars). By identifying product reviews that were written by reviewers designated as being favored, the user can have more confidence in the usefulness or relevance of these reviews.

In step 403, client 101 searches and identifies product reviews of interest on the product or service being viewed by the user using the personality report of the user. As discussed above, product reviews of interest may be identified based on the personality traits of the user (e.g., cautious person) by matching keywords or phrases (e.g., warning) in the reviews with the personality traits of the user. By using the personality traits of the user to match reviews of interest, the user can have more confidence in the usefulness or relevance of these reviews.

In step 404, client 101 displays the identified reviews of interest that meet a threshold criteria. For example, a rating system could be implemented whereby reviews with a higher amount of content that match the personality traits of the user are rated higher than those reviews that contain a lesser amount of content that match the personality traits of the user. Only those reviews that meet a threshold rating may be provided to the user. In this manner, it can be further ensured that only the most relevant product reviews are provided to the user.

Returning to step 401, if, however, the user is not browsing a website which features a product or service, then, in step 405, a determination is made by client 101 as to whether the user is browsing product reviews.

If the user is browsing product reviews, then, in step 406, client 101 searches and identifies product reviews of interest on the product or service being reviewed in the browsed reviews (i.e., the product or service that is being reviewed in the product reviews that the user is viewing) that were written by reviewers designated as favored.

In step 407, client 101 searches and identifies product reviews of interest on the product or service being reviewed in the browsed reviews (i.e., the product or service that is being reviewed in the product reviews that the user is viewing) using the personality report of the user.

In step 408, client 101 displays the identified reviews of interest that meet a threshold criteria.

Returning to step 405, if the user is not browsing product reviews, then a determination is made by client 101 as to whether the user is browsing a website which features a product or service in step 401.

In some implementations, method 400 may include other and/or additional steps that, for clarity, are not depicted. Further, in some implementations, method 400 may be executed in a different order presented and that the order presented in the discussion of FIG. 4 is illustrative. Additionally, in some implementations, certain steps in method 400 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for providing relevant product reviews to a user, the method comprising:
    monitoring a user session on a first website to gather information related to one or more of the following: purchasing habits, browsing habits and reviewing and writing product reviews;
    populating a database with actions performed by said user in connection with said monitored user session;
    generating both a personality report of said user comprising personality traits directed to actions, attitudes and behaviors of said user using said populated database and a list of reviewers designated as favored using said populated database;
    searching and identifying product reviews of interest on a product or a service using both said personality report of said user and said list of reviewers designated as favored;
    displaying, by a processor, one or more of said identified product reviews of interest on said product or said service that meet a threshold criteria to said user;
    searching and identifying said product reviews of interest on said product or said service being viewed by said user on a second website using one or more of said personality report of said user and said list of reviewers designated as favored; and
    searching and identifying said product reviews of interest on said product or said service related to a product review being viewed by said user using one or more of said personality report of said user and said list of reviewers designated as favored.

2. The method as recited in claim 1 further comprising:
    populating said database with one or more of the following actions: commenting about a product review, voting for a product review, reading a review continuation, scrolling down in a text of a product review, and sending a product review to a friend.

3. The method as recited in claim 1 further comprising:
    collecting reviews written by friends of said user, wherein said friends of said user are identified from one or more of a social network and a contact list; and
    populating said database with said collected reviews.

4. The method as recited in claim 1 further comprising:
    collecting reviews written by said user; and
    populating said database with said collected reviews.

5. The method as recited in claim 1 further comprising:
    providing said user an option to generate a product review on said product or said service; and
    receiving said generated product review from said user.

6. The method as recited in claim 5 further comprising:
    posting said received generated product review to a second website of said user's choice.

7. A computer program product embodied in a non-transitory computer readable storage medium for providing relevant product reviews to a user, the computer program product comprising the programming instructions for:
    monitoring a user session on a first website to gather information related to one or more of the following: purchasing habits, browsing habits and reviewing and writing product reviews;
    populating a database with actions performed by said user in connection with said monitored user session;
    generating both a personality report of said user comprising personality traits directed to actions, attitudes and behaviors of said user using said populated database and a list of reviewers designated as favored using said populated database;
    searching and identifying product reviews of interest on a product or a service using both said personality report of said user and said list of reviewers designated as favored;
    displaying one or more of said identified product reviews of interest on said product or said service that meet a threshold criteria to said user;
    searching and identifying said product reviews of interest on said product or said service being viewed by said user on a second website using one or more of said personality report of said user and said list of reviewers designated as favored; and
    searching and identifying said product reviews of interest on said product or said service related to a product review being viewed by said user using one or more of said personality report of said user and said list of reviewers designated as favored.

8. The computer program product as recited in claim 7 further comprising the programming instructions for:
    populating said database with one or more of the following actions: commenting about a product review, voting for a product review, reading a review continuation, scrolling down in a text of a product review, and sending a product review to a friend.

9. The computer program product as recited in claim 7 further comprising the programming instructions for:
  collecting reviews written by friends of said user, wherein said friends of said user are identified from one or more of a social network and a contact list; and
  populating said database with said collected reviews.

10. The computer program product as recited in claim 7 further comprising the programming instructions for:
  collecting reviews written by said user; and
  populating said database with said collected reviews.

11. The computer program product as recited in claim 7 further comprising the programming instructions for:
  providing said user an option to generate a product review on said product or said service; and
  receiving said generated product review from said user.

12. The computer program product as recited in claim 11 further comprising the programming instructions for:
  posting said received generated product review to a second website of said user's choice.

13. A system, comprising:
  a memory unit for storing a computer program for providing relevant product reviews to a user; and
  a processor coupled to said memory unit, wherein said processor, responsive to said computer program, comprises:
    circuitry for monitoring a user session on a first website to gather information related to one or more of the following: purchasing habits, browsing habits and reviewing and writing product reviews;
    circuitry for populating a database with actions performed by said user in connection with said monitored user session;
    circuitry for generating both a personality report of said user comprising personality traits directed to actions, attitudes and behaviors of said user using said populated database and a list of reviewers designated as favored using said populated database;
    circuitry for searching and identifying product reviews of interest on a product or a service using both said personality report of said user and said list of reviewers designated as favored;
    circuitry for displaying one or more of said identified product reviews of interest on said product or said service that meet a threshold criteria to said user;
    circuitry for searching and identifying said product reviews of interest on said product or said service being viewed by said user on a second website using one or more of said personality report of said user and said list of reviewers designated as favored; and
    circuitry for searching and identifying said product reviews of interest on said product or said service related to a product review being viewed by said user using one or more of said personality report of said user and said list of reviewers designated as favored.

14. The system as recited in claim 13, wherein said processor further comprises:
  circuitry for populating said database with one or more of the following actions: commenting about a product review, voting for a product review, reading a review continuation, scrolling down in a text of a product review, and sending a product review to a friend.

15. The system as recited in claim 13, wherein said processor further comprises:
  circuitry for collecting reviews written by friends of said user, wherein said friends of said user are identified from one or more of a social network and a contact list; and
  circuitry for populating said database with said collected reviews.

16. The system as recited in claim 13, wherein said processor further comprises:
  circuitry for collecting reviews written by said user; and
  circuitry for populating said database with said collected reviews.

* * * * *